(12) United States Patent
Hoffman et al.

(10) Patent No.: US 6,369,818 B1
(45) Date of Patent: Apr. 9, 2002

(54) METHOD, APPARATUS AND COMPUTER PROGRAM PRODUCT FOR GENERATING PERSPECTIVE CORRECTED DATA FROM WARPED INFORMATION

(75) Inventors: Robert G. Hoffman, Fremont; John Louis Warpakowski Furlan, Palo Alto, both of CA (US)

(73) Assignee: Be Here Corporation, Cupertino, CA (US)

( * ) Notice: Subject to any disclaimer, the term of this patent is extended or adjusted under 35 U.S.C. 154(b) by 0 days.

(21) Appl. No.: 09/200,172

(22) Filed: Nov. 25, 1998

(51) Int. Cl.⁷ .............................................. G06T 15/00
(52) U.S. Cl. ...................................................... 345/427
(58) Field of Search ................................ 345/419, 427, 345/433, 423, 424, 441, 442, 443

(56) References Cited

U.S. PATENT DOCUMENTS

| 2,146,662 A | 2/1939 | Van Albada | 352/69 |
| 2,244,235 A | 6/1941 | Ayres | 348/37 |

(List continued on next page.)

FOREIGN PATENT DOCUMENTS

| FR | 1234341 | 5/1960 |
| GB | 2 221 118 A | 1/1990 |
| GB | 2289820 | 11/1995 |
| JP | HEI 2-127877 | 11/1988 |

OTHER PUBLICATIONS

Supplemental Information Disclosure Statement in re: the Application of Steven D. Zimmerman, et al. Application No. 08/662,410; 8 Pages including PTO 1449 Form citing 19 references. Application No. 08/662,410; Filed Jul. 12, 1996. Filed: Jul. 12, 1996.

Heckbert, P., "Survey of Texture Mapping" IEEE CG&A, Nov. 1986, pp. 56–67.

(List continued on next page.)

*Primary Examiner*—Phu K. Nguyen
(74) *Attorney, Agent, or Firm*—Daniel B. Curtis

(57) ABSTRACT

Apparatus, methods, and computer program products are disclosed that provides fast and accurate means of mapping one data space into another by precisely mapping grid points between the data spaces and then by performing a bilateral-bilinear interpolation to map the points bounded by the precisely mapped grid points. The precisely mapped grid points define boundary lines that bound a data region in a source: space. Each scan line mapped to the source space is dependent on the slopes of the bounding lines of the data region.

25 Claims, 8 Drawing Sheets

U.S. PATENT DOCUMENTS

| | | | |
|---|---|---|---|
| 2,304,434 A | 12/1942 | Ayres | 396/22 |
| 2,628,529 A | 2/1953 | Braymer | 359/220 |
| 2,654,286 A | 10/1953 | Cesar | 359/725 |
| 3,203,328 A | 8/1965 | Brueggeman | 352/69 |
| 3,205,777 A | 9/1965 | Benner | 396/24 |
| 3,229,576 A | 1/1966 | Rees | 396/21 |
| 3,692,934 A | 9/1972 | Hemdon | 352/69 |
| 3,723,805 A | 3/1973 | Scarpino et al. | 359/373 |
| 3,785,715 A | 1/1974 | Mecklenborg | 315/370 |
| 3,832,046 A | 8/1974 | Mecklenborg | 348/36 |
| 3,846,809 A | 11/1974 | Pinzone et al. | 359/364 |
| 3,872,238 A | 3/1975 | Herndon | 348/38 |
| 3,934,259 A | 1/1976 | Krider | 248/480 |
| 3,998,532 A | 12/1976 | Dykes | 396/21 |
| 4,012,126 A | 3/1977 | Rosendahl et al. | 359/448 |
| 4,017,145 A | 4/1977 | Jerie | 359/366 |
| 4,038,670 A | 7/1977 | Seitz | 355/46 |
| 4,058,831 A | 11/1977 | Smith | 359/504 |
| 4,078,860 A | 3/1978 | Globus et al. | 359/423 |
| 4,157,218 A | 6/1979 | Gordon et al. | 348/148 |
| 4,190,866 A | 2/1980 | Lukner | 382/154 |
| 4,241,985 A | 12/1980 | Globus et al. | 310/112 |
| D263,716 S | 4/1982 | Globus et al. | D16/1 |
| 4,326,775 A | 4/1982 | King | 250/216 |
| 4,395,093 A | 7/1983 | Rosendahl et al. | 348/369 |
| 4,429,957 A | 2/1984 | King | 348/39 |
| 4,463,380 A | 7/1984 | Hooks, Jr. | 352/84 |
| 4,484,801 A | 11/1984 | Cox | 359/725 |
| 4,518,898 A | 5/1985 | Tarnowski et al. | 396/24 |
| 4,549,208 A | 10/1985 | Kamejima et al. | 343/916 |
| 4,561,733 A | 12/1985 | Kreischer | 359/725 |
| 4,566,763 A | 1/1986 | Greguss | 359/856 |
| 4,578,682 A | 3/1986 | Hooper et al. | 348/147 |
| 4,593,982 A | 6/1986 | Rosset | 315/371 |
| 4,602,857 A | 7/1986 | Woltz et al. | 348/580 |
| 4,656,506 A | 4/1987 | Ritchey | 359/676 |
| 4,661,855 A | 4/1987 | Gulck | 359/725 |
| 4,670,648 A | 6/1987 | Hall et al. | 359/725 |
| 4,728,839 A | 3/1988 | Coughlan et al. | 396/24 |
| 4,736,436 A | 4/1988 | Yasukawa et al. | 348/156 |
| 4,742,390 A | 5/1988 | Francke et al. | 396/8 |
| 4,751,660 A | 6/1988 | Hedley | 345/427 |
| 4,754,269 A | 6/1988 | Kishi et al. | 345/427 |
| 4,761,641 A | 8/1988 | Schreiber | 345/1.3 |
| 4,772,942 A | 9/1988 | Tuck | 348/38 |
| 4,797,942 A | 1/1989 | Burt et al. | 382/284 |
| 4,807,158 A | 2/1989 | Blanton et al. | 345/581 |
| 4,835,532 A | 5/1989 | Fant | 345/611 |
| 4,858,002 A | 8/1989 | Zobel | 348/65 |
| 4,858,149 A | 8/1989 | Quarendon | 345/419 |
| 4,864,335 A | 9/1989 | Corrales | 396/24 |
| 4,868,682 A | 9/1989 | Shimizu et al. | 386/96 |
| 4,899,293 A | 2/1990 | Dawson et al. | 345/423 |
| 4,901,140 A | 2/1990 | Lang et al. | 348/816 |
| 4,907,084 A | 3/1990 | Nagafusa | 348/691 |
| 4,908,874 A | 3/1990 | Gabriel | 382/277 |
| 4,918,473 A | 4/1990 | Blackshear | 396/427 |
| 4,924,094 A | 5/1990 | Moore | 250/334 |
| 4,943,821 A | 7/1990 | Gelphman et al. | 396/24 |
| 4,943,851 A | 7/1990 | Lang et al. | 348/37 |
| 4,945,367 A | 7/1990 | Blackshear | 396/427 |
| 4,965,844 A | 10/1990 | Oka et al. | 345/581 |
| D312,263 S | 11/1990 | Charles | D16/237 |
| 4,974,072 A | 11/1990 | Hasegawa | 358/514 |
| 4,985,762 A | 1/1991 | Smith | 348/39 |
| 4,991,020 A | 2/1991 | Zwirn | 348/563 |
| 5,005,083 A | 4/1991 | Grage et al. | 348/588 |
| 5,020,114 A | 5/1991 | Fujioka et al. | 348/563 |
| 5,021,813 A | 6/1991 | Corrales | 348/588 |
| 5,023,725 A | 6/1991 | McCutchen | 396/24 |
| 5,038,225 A | 8/1991 | Maeshima | 358/461 |
| 5,040,055 A | 8/1991 | Smith | 348/39 |
| 5,048,102 A | 9/1991 | Tararine | 382/300 |
| 5,067,019 A | 11/1991 | Juday et al. | 348/580 |
| 5,068,735 A | 11/1991 | Tuchiya et al. | 348/213 |
| 5,077,609 A | 12/1991 | Manephe | 348/144 |
| 5,083,389 A | 1/1992 | Alperin | 40/539 |
| 5,097,325 A | 3/1992 | Dill | 348/37 |
| 5,115,266 A | 5/1992 | Troje | 396/21 |
| 5,130,794 A | 7/1992 | Ritchey | 348/39 |
| 5,142,354 A | 8/1992 | Suzuki et al. | 348/677 |
| 5,153,716 A | 10/1992 | Smith | 348/39 |
| 5,157,491 A | 10/1992 | Kassatly | 348/14.08 |
| 5,166,878 A | 11/1992 | Poelstra | 701/200 |
| 5,173,948 A | 12/1992 | Blackham et al. | 382/293 |
| 5,175,808 A | 12/1992 | Sayre | 345/647 |
| 5,185,667 A | 2/1993 | Zimmermann | 348/207 |
| 5,187,571 A | 2/1993 | Braun et al. | 348/39 |
| 5,189,528 A | 2/1993 | Takashima et al. | 358/448 |
| 5,200,818 A | 4/1993 | Neta et al. | 348/39 |
| 5,224,208 A * | 6/1993 | Miller, Jr. et al. | 395/125 |
| 5,231,673 A | 7/1993 | Elenga | 382/132 |
| 5,259,584 A | 11/1993 | Wainwright | 248/542 |
| 5,262,852 A | 11/1993 | Eouzan et al. | 348/39 |
| 5,262,867 A | 11/1993 | Kojima | 348/39 |
| 5,280,540 A | 1/1994 | Addeo et al. | 348/14.1 |
| 5,289,312 A | 2/1994 | Hashimoto et al. | 359/487 |
| 5,305,035 A | 4/1994 | Schonherr et al. | 396/22 |
| 5,311,572 A | 5/1994 | Freides et al. | 379/211.02 |
| 5,313,306 A | 5/1994 | Kuban et al. | 348/65 |
| 5,315,331 A | 5/1994 | Ohshita | 396/20 |
| 5,341,218 A | 8/1994 | Kaneko et al. | 348/695 |
| 5,359,363 A | 10/1994 | Kuban et al. | 348/36 |
| 5,384,588 A | 1/1995 | Martin et al. | 348/14.1 |
| 5,396,583 A | 3/1995 | Chen et al. | 345/427 |
| 5,422,987 A | 6/1995 | Yamada | 345/427 |
| 5,432,871 A | 7/1995 | Novik | 382/232 |
| 5,444,476 A | 8/1995 | Conway | 348/14.1 |
| 5,446,833 A | 8/1995 | Miller et al. | 348/39 |
| 5,452,450 A | 9/1995 | Delory | 707/10 |
| 5,473,474 A | 12/1995 | Powell | 359/72.5 |
| 5,479,203 A | 12/1995 | Kawai et al. | 348/14.1 |
| 5,490,239 A | 2/1996 | Myers | 345/581 |
| 5,495,576 A | 2/1996 | Ritchey | 345/420 |
| 5,508,734 A | 4/1996 | Baker et al. | 348/36 |
| 5,530,650 A | 6/1996 | Bifero et al. | 701/300 |
| 5,539,483 A | 7/1996 | Nalwa | 353/94 |
| 5,550,646 A | 8/1996 | Hassen et al. | 358/442 |
| 5,563,650 A | 10/1996 | Poelstra | 353/122 |
| 5,601,353 A | 2/1997 | Naimark et al. | 353/122 |
| 5,606,365 A | 2/1997 | Maurinus et al. | 348/222 |
| 5,610,391 A | 3/1997 | Ringlien | 250/223 B |
| 5,612,533 A | 3/1997 | Judd et al. | 250/208.1 |
| 5,627,675 A | 5/1997 | Davis et al. | 359/366 |
| 5,631,778 A | 5/1997 | Powell | 359/724 |
| 5,633,924 A | 5/1997 | Kaish et al. | 379/266.03 |
| 5,649,032 A | 7/1997 | Burt et al. | 382/284 |
| 5,682,511 A | 10/1997 | Sposato et al. | 345/716 |
| 5,686,957 A | 11/1997 | Baker et al. | 348/36 |
| 5,714,997 A | 2/1998 | Anderson et al. | 348/39 |
| 5,729,471 A | 3/1998 | Jain et al. | 725/131 |
| 5,748,194 A | 5/1998 | Chen | 345/427 |
| 5,760,826 A | 6/1998 | Nayer | 345/427 |
| 5,761,416 A | 6/1998 | Mandet et al. | 709/250 |
| 5,764,276 A | 6/1998 | Martin et al. | 725/146 |
| 5,796,426 A | 8/1998 | Gullichsen et al. | 348/207 |
| 5,841,589 A | 11/1998 | Davis et al. | 359/726 |
| 5,844,520 A | 12/1998 | Guppy et al. | 342/177 |
| 5,850,352 A | 12/1998 | Moezzi et al. | 359/726 |
| 5,854,713 A | 12/1998 | Kuroda et al. | 359/850 |
| 5,877,801 A | 3/1999 | Martin et al. | 348/36 |

| | | | |
|---|---|---|---|
| RE36,207 E | 5/1999 | Zimmerman et al. | 348/207 |
| 5,903,319 A | 5/1999 | Busko et al. | 348/607 |
| 5,920,337 A | 7/1999 | Glassman et al. | 348/36 |
| 5,990,941 A | 11/1999 | Jackson et al. | 348/207 |
| 6,002,430 A | 12/1999 | McCall et al. | 427/548 |
| 6,034,716 A | 3/2000 | Whiting et al. | 348/36 |
| 6,043,837 A | 3/2000 | Driscoll, Jr. et al. | 348/36 |

OTHER PUBLICATIONS

Defendants IPI's Notice of Reliance of Prior Art and Witnesses, Civil Action of Interactive Pictures Corporation, A/K/A Omniview, Inc. v. Infinite Pictures, Inc. and Bill Tillman, Case No. 3–96–849; 05 Pages. Filed: Dec. 8, 1997, in U.S.D.C., Eastern District of Tennessee.
Defendant IPI's Composit Exhibit List, Civil Action of interactive Pictures Corporation, F/K/A Omniview, Inc. v. Infinite Pictures, Inc. and Bill Tillman, Case No. 3–96–849. Filed: Jan. 5, 1998, in U.S.D.C., Eastern District of Tennessee. p.: 20.
Plaintiff's Rule 26(a)(3) Disclosures, Civil Action of Interactive Pictures Corporation, F/K/A Omniview, Inc. v. Infinite Pictures, Inc. and Bill Tillman, Case No. 3–96–849; 31 Pages. Filed: Dec. 8, 1997, in U.S.D.C., Eastern District of Tennessee.
Plaintiff's Supplemental Trial Exhibit List, Civil Action of Interactive Pictures Corporation, F/K/A Omniview, Inc. v. Infinite Pictures, Inc. and Bill Tillman, Case No. 3–96–849; 41 Pages. Filed: Jan. 2, 1998, in U.S.D.C., Eastern District of Tennessee.
Ripley G. David, "DVI–A Digital Multimedia Technology". Communication of the ACM. Jul. 1989. vol. 32. No. 07. pp.: 811–820.
Cnoe M. and Kuno Y., "Digital Processing CF Images Taken By Fish–Eye Lens". 1982. IEEE. pp.: 105–108.
Hamit, F., "Near–Fisheye CCD Camera Broadens View for Imaging". Advanced Imaging. Mar. 1993. pp.: 50–52.
Dixon, D., Golin, S., and Hasfield, I., "DVI Video–Graphics". Computer Graphics World reprinted from the Jul. 1987 edition of Computer Graphics World. pp.: 04.
Upstill, Steve. "Building Stronger Images". UNIX Review. Oct. 1988. vol. 06. No. 10. pp.: 63–73.
Greene, N., "Environment Mapping and Other Applications of the World Projection." Computer Graphics and Applications. Nov. 1986. IEEE Computer Society. vol. 06. No. 11. pp.: 21–29.
Hechbert P., "The PMAT and Poly User's Manual". Computer Graphics Lab. N.Y.I.T., Feb. 18, 1983. pp.: 1–29.
Heckbert, P., Fundamentals of Textured Mapping and Image Warping. Master Thesis. pp.: 86. Dated: Jun. 17, 1989.
Rebiai,M., Mansouri,S., Pinson,F., and Tichit, B., "Image Distortion From Zoom Lenses: Modeling and Digital Correction". International Broadcasting Convention. IEEE. Dated: Jul. 1992.
Charles Jeffery, R., "All–Sky Reflector with "Invisible" Camera Support". Images from 1988 RTMC Proceedings. pp.: 79–80.
Roger W. Sinnott, "Scientific Library Gleaning for ATMs". Sky & Telescope. Aug. 1986. pp.: 186.
Charles et al., "How to Build and Use an All–Sky Camera." Astronomy. Apr. 1987. pp.: 64–70.
Deutsch, Cludia H., "One Camera That Offers Many Views". The New York Times, 1987.
Johnson, Colin R., "Imaging System Sees All". Electronic Engineering Times. Dec. 25, 1996. pp.: 1&98.
"Panospheric Camera Expands Horizon". p.: 1, 1986.

"Panospheric Camera Developed at Carnegie Mellon Expands Horizon". p.: 1, 1992.
Castleman, K., "Digital Image Processing". Prentice Hall. 1979. pp.: 110–135, 383–400, 408.
Castleman, K., "Digital Image Processing". Prentice Hall. 1996. pp.: 125–127, 140–141.
Shah, S., A Simple Calibration Procedure For Fish–Eye (High Distortion) Lens. IEEE. 1994. pp.: 3422–3427.
"Gnomonic Projection". Map Projections—A Working Manual. pp.: 164–168, 1994.
Greene, N., and Heckbert, P., "Creating Raster Omnimax Images From Multiple Perspective Views Using The Elliptical Weighted Average Filter". IEEE. 1986. pp.: 21–27.
Fant, K., "A Nonaliasing, Real–Time Spatial Formation Technique". IEEE. 1986. pp.: 71–80.
Greene, William B., "Qualitative Image Processing Techniques". Digital Image Processing, A Systems Approach. $2^{nd}$ Edition. 1989. Van Nostrand Reinhold. pp.: 92–112.
Wolberg, George. Digital Image Warping (Introduction). 1990. IEEE Computer Society Press. pp.: 2.
Fu, K.S. et al., "Low–Level Vision". Robotics: Control, Sensing, Vision, and Intelligence. 1987.McGraw Hill Inc., pp.: 313–315.
Carlbom, Ingrid et al. "Planner Geometric Projections and Viewing Transformations". Computing Surveys. vol. 10. No. 04. Dec. 1978. pp.: 465–502.
Anderson, R.L., et al., "Omnidirectional Real time Imaging Using Digital Restoration". High Speed Photography SPIE. vol. 348. San Diego, CA. 1982. pp.: 807–814.
Laikin, Milton. "Wide Angle Lens System". 1980. International Design Conference (OSA). SPIE. vol. 237. 1980. pp.: 530–532, 815–816.
Shah, Shisir et al., "Depth Estimation using Fish–Eye Lenses". IEEE. Department Of Electrical and Computer Engineering. University of Texas. 1994. pp.: 740–744.
Tsai, Roger Y., "A Versatile Camera Calibration Technique for High Accuracy 3–D Machine Vision Using Off–the–Shelf TV Cameras and Lenses". IEEE. Journal of Robotics and Automation. vol. RA–3. No. 04. Aug. 1987. pp.: 323–344.
Chang, Yuh–Lin et al., "Calibrating a Mobile Camera's Parameters". Pattern Recognition. vol. 26. No. 01. Dated: 1983. pp.: 75–88.
Weng, Juyang. "Camera Calibration With Distortion Models and Accuracy". IEEE. Transactions On Pattern Analysis and Machine Intelligence. vol. 14. No. 10. Oct. 1992. pp.: 965–980.
Lenz, Reimer K. et al., "Technique for Calibration of the Scale Factor and Image Center for High Accuracy 3–D Machine Vision Metrology". IEEE. Transactions on Pattern Analysis and Machine Intelligence. vol. 05. No. 05. Sep. 1988. pp.: 713–720.
Nomura, Yoshihiko, et al., "A Simple Calibration Algorithm for High–Distortion Lens Camera". IEEE. Transaction on Pattern Analysis and Intelligence Machine. vol. 14. No. 11. Nov. 1992. pp.: 1095–1099.
International Broadcasting Convention Venue RAI Congress And Exhibition Centre, Amersterdam, The Netherlands. Jul. 3–7, 1992. pp.:06, Including the title page.
Telerobotics International, Inc. "Optimizing The Camera And Positioning System For Telerobotic Workcite Viewing", 1993.
Miyamoto, K., "Fish Eye Lens". JOSA. vol. 54. pp.: 1060–1061. Dated: Aug. 1964.

Defendant's IPI's Composite Exhibit List, Civil Action of Interactive Pictures Corporation, F/K/A Omniview, Inc. v. Infinite Pictures, Inc. and Bill Tillman. Case No. 3–96–849. Filed: Jan. 5, 1998 in U.S.D.C., Eastern District Of Tennessee. pp.: 20.

Baltes, M. "Bevet D'Intervention". Ref. No.: 1.234.341, 1984.

Verity, John W. (edited by): Information Processing. Business Week. pp.: 134E. Dated: Jul. 13, 1992.

Marbach, William D. (edited by): Developments To Watch. Business Week. pp.: 83. Dated: Sep. 26, 1988.

Lu Carnevale, Mary. Video Camera Puts The Viewer in Control. Wall Street Journal. Dated: Nov. 25, 1992.

Popular Science. Electronic Panning Camera System. pp.: 36–37. Dated: Sep. 1992.

Tulloch, Martha. "New Video Camera . . . " Photonics Spectra. pp.: 18–20. Dated: Oct. 1992.

Fisher, Timothy E., A Programmable Video Image Remapper. SPIE> vol. 938. pp.: 122–128. Dated: 1988.

Lippman, Andrew. Movie–Map: An Application Of The Optical Videodisc To Computer Graphics. pp.: 43. Dated: 1980.

Yelick, Steven. Anamorphic Image Processing. pp.: 1–37, Including Acknowledgement Page. Dated: 1980.

Chen, Shenchang Eric. Quick Time VR–An Image–Based Approach To Virtual Environment Navigation. pp.: 39. Dated: 1995.

* cited by examiner

150

160

METHOD, APPARATUS AND COMPUTER PROGRAM PRODUCT FOR GENERATING PERSPECTIVE CORRECTED DATA FROM WARPED INFORMATION

BACKGROUND OF THE INVENTION

1. Field of the Invention

This invention relates to the field computer technology for mapping one data space to another data space.

2. Background

Computers are often used to map data that exists in a source data space to a destination data space. This type of mapping is often used in "virtual reality" and "telepresence" applications. The data in the source data space can represent a warped image that is obtained by a distorting lens such as a fisheye lens or a catadioptric lens. The data in the destination data space can be presented by a presentation device such as a video screen, computer monitor or printer. The problem is how to rapidly generate the data for the destination data space from the source data space.

One approach is to backward map the coordinates of a point in the destination data space to coordinates in the source data space and to obtain the value for the point in the destination data space from the mapped point in the source data space. Precisely mapping each point (for example, by using floating point calculations to perform the mapping) is expensive in either memory or computation, or both.

Another approach is to precisely map a grid of points from the destination data space to the source data space. These grid points bound regions (patches) that contain pixels that have similar mapping as the grid points that bound the region. Thus, the precisely mapped grid points are used to determine coefficients for a mapping that can be applied to each point in the region. Each of the grid points in the destination data space has a corresponding grid point in the source data space. Thus, the destination grid point and the corresponding source grid point are referred to as a "point pair."

By using all four of the destination and source point pairs that bound a region, a perspective transformation can be computed and used to find the corresponding pixel in the source data space. Thus, $$x_s = \frac{ax_d + by_d + t_x}{ex_d + fy_d + 1}$$

$$y_s = \frac{cx_d + dy_d + t_y}{ex_d + fy_d + 1}$$

Can be used to perform the mapping where $(x_s, y_s)$ is the is the resulting coordinate in the source data space, $(x_d, y_d)$ is the coordinates of the pixel in the destination data space, and a, b, c, d, e, f $t_x$ and $t_y$ are the perspective transform coefficients. This calculation includes at least six multiply operations, two division operations, and six add operations. The multiply and division operations are computationally expensive., Although this equation does not generate mapping artifacts between the regions, the additional computational overhead is often prohibitive.

Another approach is to generate a look-up table that provides the $x_s$ and $y_s$ coordinates when given the $x_d$ and $y_d$ coordinates. With high resolution images and high-resolution presentation devices, these look-up tables become unwieldy even with modem computers.

Another approach is to approximately map the region using a less computationally expensive formula. For example, an affine transformation can be used to perform this mapping. In this circumstance, three of the four sets of destination and source point pairs are used to compute the affine coefficients for the transformation. Then coordinates that specify a pixel that in the destination data space can be used to find the corresponding pixel in the source data space. Thus, $$x_s = ax_d + by_d + c$$

$$y_s = dx_d + ey_d + f$$

Where $(x_s, y_s)$ is the resulting coordinate in the source data space, $(x_d, y_d)$ is the coordinates of the pixel in the destination data space, and a, b, c, d, e and f are the affine coefficients for the grid region bounded by the precisely mapped grid points. This calculation includes four multiply operations and four add operations for each pixel in the patch and so is still computationally expensive. An additional problem with this approach is that an affine transformation often generates a very poor approximation to the perspective transformation. The affine transformation only uses three of the four point pairs that bound the region. Thus, the affine transformation can generate mapping artifacts (such as discontinuities) along edges of the quadralateral defining the region in the source space.

FIG. 1A illustrates a quadralateral patch in source space, indicated by general reference character 100, used to show mapping artifacts generated by the affine transformation. The quadralateral patch in source space 100 is bounded by grid points (such as a point A 101, a point B 103, a point C 105, and a point D 107). Applying an affine transformation to this region (using the points 101, 103, and 105 and the corresponding points in the destination space) would generate the patch bounded by the point A 101, the point B 103, the point C 105 and a point D' 109 instead of approximating the original patch.

FIG. 1B illustrates a presentation of a correctly mapped image, indicated by general reference character 150, that represents a magnified image presented on a presentation device. This image does not have any mapping artifacts. It can be generated by precisely mapping each point in the destination data space to the source data space. It can also be generated by precisely mapping grid points, and using the perspective transformation previously discussed to map the points in each region defined by the grid. Compare FIG. 1B with FIG. 1C.

FIG. 1C illustrates a presentation of an incorrectly mapped image, indicated by general reference character 160, that shows mapping artifacts 161 that can result from the use of the affine transformation. As can be seen, these mapping artifacts include discontinuities in lines. Other mapping artifacts include (without limitation) texture discontinuities and color discontinuities.

It would be advantageous to use a fast mapping algorithm that also provides a good approximation for a precise perspective-correct transformation that maintains continuity across patch boundaries without the computational or memory overheads associated with the prior art. Devices and computers that use these methods will operate more efficiently than those that use prior art methods will.

SUMMARY OF THE INVENTION

The invention provides a fast and accurate means of mapping one data space into another by precisely mapping grid points between the data spaces and then by performing a bilateral-bilinear interpolation to map the points bounded by the precisely mapped grid points.

One aspect of the invention is a computer-controlled method that includes the step of determining a region in a destination data space. The region is bounded by a plurality of grid points. It defines a first plurality of data points in the destination data space. The method precisely maps the plurality of grid points in the destination data space to a plurality of mapped grid points in a source data space. The source data space contains, or is associated with, a second plurality of data points. The plurality of mapped grid points define a plurality of boundary lines that represent the boundary of the region as mapped into the source data space. The method also applies a bilateral-bilinear interpolation algorithm to approximately map the first plurality of data points to the second plurality of data points.

Another aspect of the invention is an apparatus that includes a central processing unit (CPU) and a memory coupled to the CPU. The apparatus also includes a region determination mechanism that is configured to determine a region in a destination data space. The region is bounded by a plurality of grid points. The region defines a first plurality of data points within the destination data space. The apparatus also includes a precise mapping mechanism that is configured to precisely map the plurality of grid points determined by the region determination mechanism to a plurality of mapped grid points in a source data space. The source data space contains (or associates) a second plurality of data points. The plurality of mapped grid points define a plurality of boundary lines that represent the boundary of the region as mapped into the source data space. The apparatus also includes a bilateral-bilinear interpolation mechanism that is configured to approximately map the first plurality of data points in the region to the second plurality of data points using the plurality of mapped grid points.

Yet another aspect of the invention, is a computer program product that includes a computer usable storage medium having computer readable code embodied therein for causing a computer to map a destination data space to a source data space. When executed on a computer, the computer readable code causes the computer to effect a precise mapping mechanism, a region determination mechanism, and a bilateral-bilinear interpolation mechanism. Each of these mechanisms having the same functions as the corresponding mechanisms for the previously described apparatus.

Still another aspect of the invention is a computer program product embodied in a carrier wave transmitting computer readable code therein for causing a computer to map a destination data space to a source data space. When executed on a computer, the computer readable code causes the computer to effect a precise mapping mechanism, a region determination mechanism, and a bilateral-bilinear interpolation mechanism. Each of these mechanisms having the same functions as the corresponding mechanisms for the previously described apparatus.

DESCRIPTION OF THE PREFERRED EMBODIMENTS

Notations and Nomenclature

The following 'notations and nomenclature' are provided to assist in the understanding of the present invention and the preferred embodiments thereof.

Procedure

A procedure is a self-consistent sequence of computerized steps that lead to a desired result. These steps are defined by one or more computer instructions. These steps are performed by a computer executing the instructions that define the steps. Thus, the term "procedure" can refer to a sequence of instructions, a sequence of instructions organized within a programmed-procedure or programmed-function, or a sequence of instructions organized within programmed-processes executing in one or more computers.

Operating Environment

Figure 2:
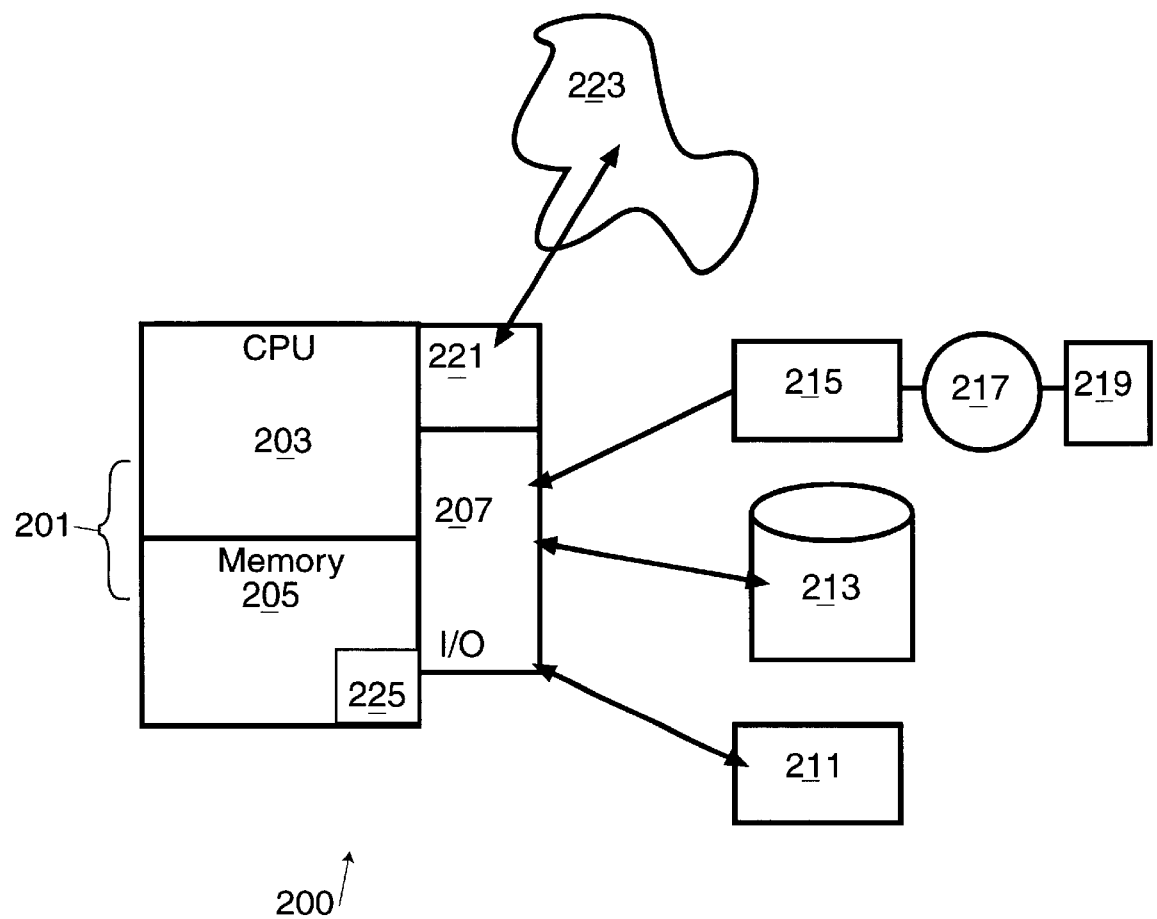
FIG. 2 illustrates a computer system capable of using the invention in accordance with a preferred embodiment.

FIG. 2 illustrates a computer, indicated by general reference character 200, that incorporates the invention. The computer 200 includes a processor 201 having a central processor unit (CPU) 203, a memory section 205, and an input/output (I/O) section 207. The I/O section 207 is connected to a presentation device 211, a disk storage unit 213 and a CD-ROM drive unit 215. The CD-ROM drive unit 215 can read a CD-ROM medium 217 that typically contains a program and data 219. The CD-ROM drive unit 215 (along with the CD-ROM medium 217) and the disk storage unit 213 comprise a filestorage mechanism (a filesystem). Some embodiments of the invention include a network interface 221 that connects the computer 200 to a network 223. An application program 225 executes from the memory section 205. The application program 225 can be loaded into the memory section 205 over the network 223 or from the filesystem. In one embodiment of the invention, the application program 225 includes computer code that causes the computer to perform the inventive steps. The CD-ROM drive unit 215 (along with the CD-ROM medium 217) are illustrative of mechanisms that can be used to read computer code from a removable media. One skilled in the art will understand that not all of the displayed features of the computer 200 need to be present for the invention.

Data Space

One aspect of the invention maps points between two data spaces. FIG. 3A through FIG. 3D illustrate some of the possible data spaces that can be mapped by this aspect of the invention.

Figure 3A:
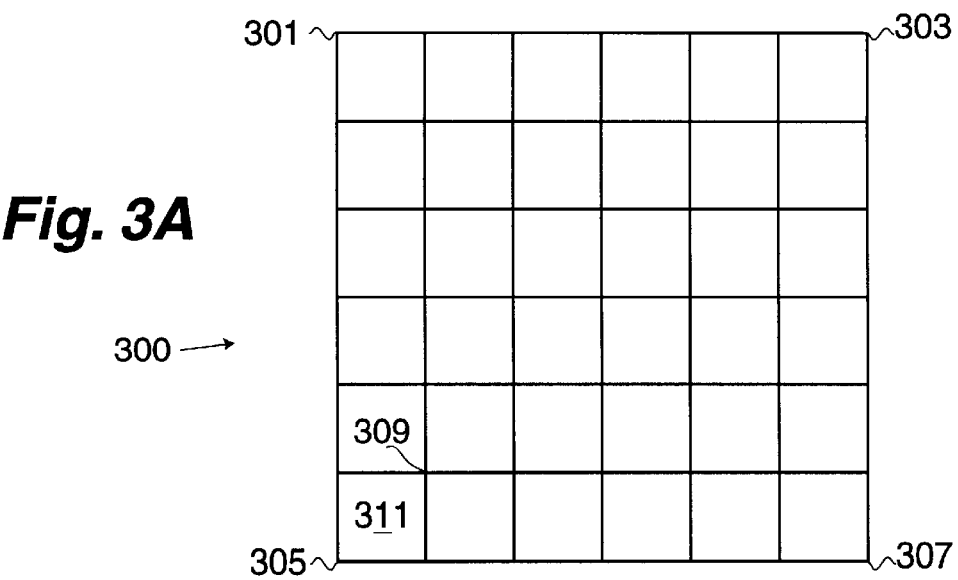
FIG. 3A illustrates a gridded destination data space in two-dimensions in accordance with a preferred embodiment.

FIG. 3A illustrates a gridded destination data space 300 showing a first grid point 301, a second grid point 303, a third grid point 305, and a fourth grid point 307. These points are bounding points for the destination data space. Each of the intersections in the destination data space (for example a fifth grid point 309) is precisely mapped to a source data space. The grid points bound regions that contain data points that will be approximately mapped to the source data space. For example, the third grid point 305 and the fifth grid point 309 are two of the four grid points that bound a region 311 that contains points having mappings that will be interpolated. A bilateral-bilinear interpolation algorithm performs this approximate mapping. The bilateral-bilinear interpolation algorithm is subsequently described with respect to FIG. 5 and FIG. 6 as applied to patches in a two-dimensional data space.

Figure 3B:
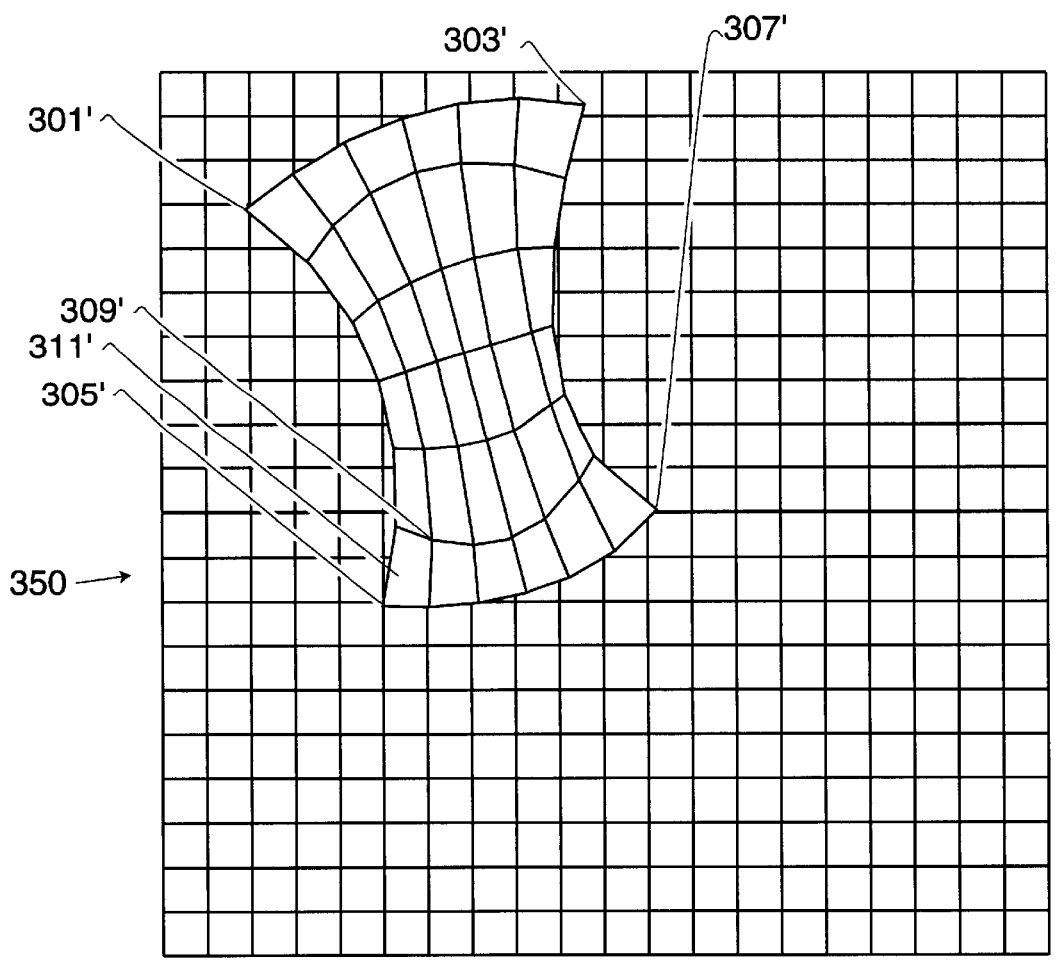
FIG. 3B illustrates a gridded source data space with a mapped destination data space in two-dimensions in accordance with a preferred embodiment

FIG. 3B illustrates, a gridded source data space 350 indicating how the destination data space is mapped to the source data space. The resolution of the gridded destination data space 300 and the gridded source data space 350 need not be the same. The gridded source data space 350 can contain (or reference) warped image, data that represents a true image that has been warped by a lens. One skilled in the art will understand that a physical lens need not be used to generate the warped image as ray-tracing techniques through a virtual lens can also be used to generate the warped image. A virtual lens can be used to generate images in a virtual-space. Once the image is generated, the invention can be used to present the image.

One aspect of the invention backward maps the destination data space to the source data space using a mapping that generates a perspective corrected image in the destination data space. One step in this mapping process precisely maps the first grid point 301, the second grid point 303, the third grid point 305, the fourth grid point 307, the fifth grid point 309, and other grid points to the gridded source data space 350. These grid points map to a mapped first grid point 301', a mapped second grid point 303', a mapped third grid point 305', a mapped fourth grid point 307', a mapped fifth grid point 309' and other grid points respectively in the source data space. Thus, the region 311 is mapped to a mapped region 311'.

Notice that the gridded destination data space 300 when mapped into the gridded source data space 350 need not result in a parallelogram—the slopes of each of the lines defined by the mapped grid points can be different.

Figure 3D:
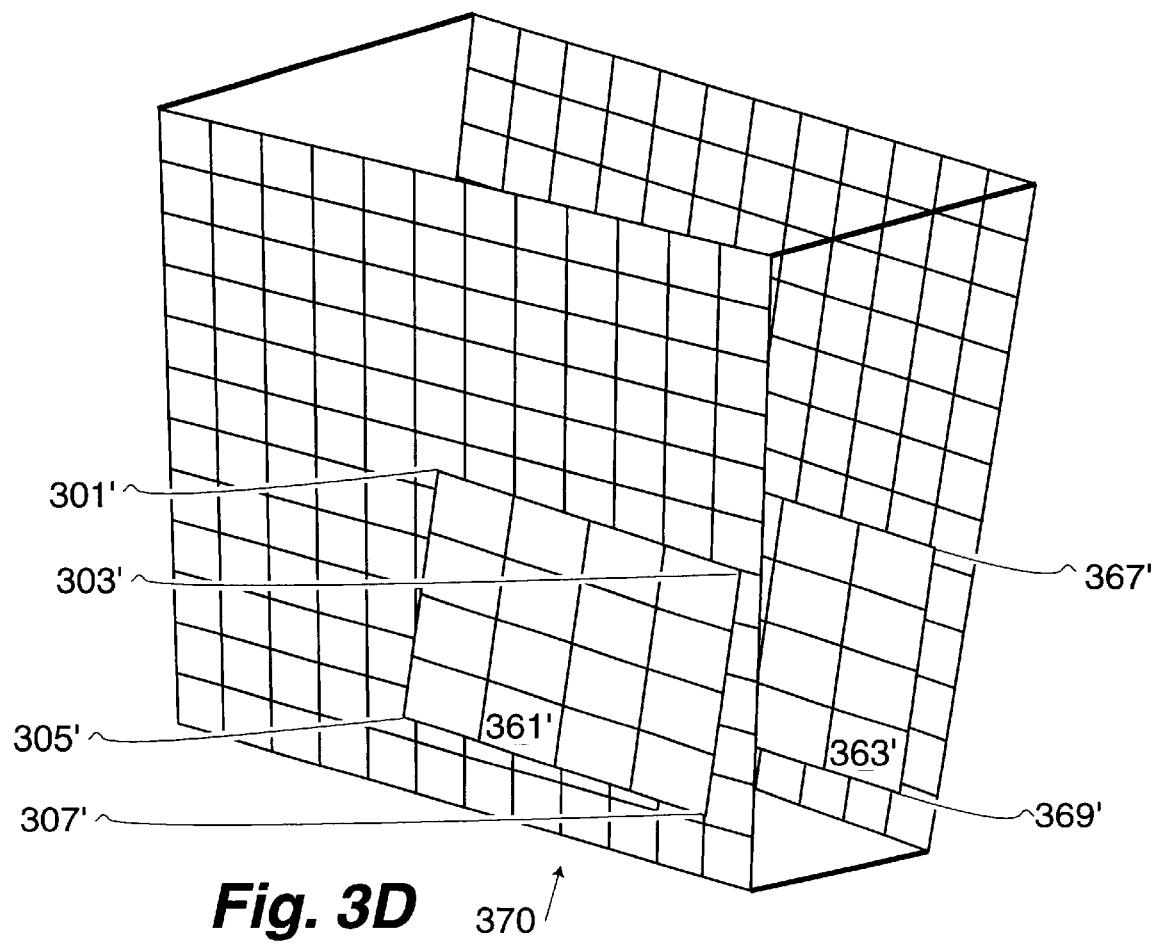
FIG. 3D illustrates a gridded source data space with a mapped destination data space in three-dimensions in accordance with a preferred embodiment
Figure 3C:
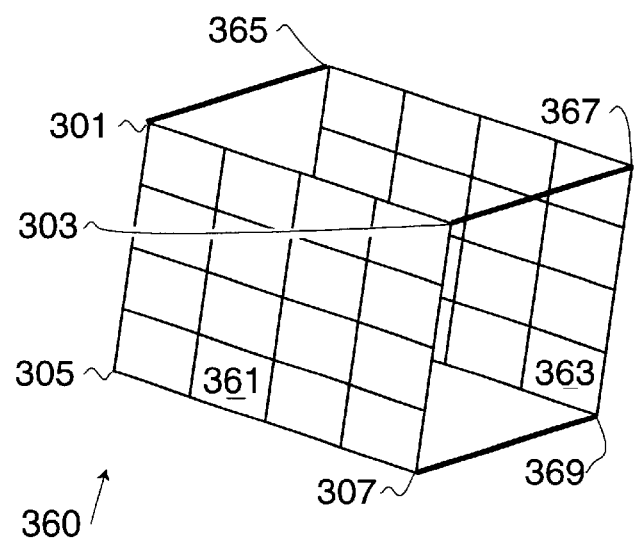
FIG. 3C illustrates a gridded destination data space with a mapped destination data space in three-dimensions in accordance with a preferred embodiment

FIG. 3C illustrates a 3-D gridded destination data space, indicated by general reference character 360, that has a first plane 361 (bounded by the first grid point 301, the second grid point 303, the third grid point 305 and the fourth grid point 307) and a second plane 363 (sp) (bounded by a sp-first grid point 365, a sp-second grid point 367, a sp-third grid point 369 and another point that cannot be seen in FIG. 3C).

FIG. 3D illustrates a 3-D gridded source data space, indicated by general reference character 370, that indicates how the 3-D gridded destination data space 360 is mapped to the 3-D gridded source data space 370. A mapped first plane 361' is bounded by the mapped first grid point 301', the mapped second grid point 303', the mapped third grid point 305', and the mapped fourth grid point 307'. A mapped second plane 363' (msp) is bounded by a msp-second grid point 367', and a msp-third grid point 369', and two other points that cannot be seen in FIG. 3D.

FIG. 3C and FIG. 3D show how grid points can be imposed on three-dimensional spaces. Once the grid points are precisely mapped, the points contained in the region (the volume) between and including the first plane 361 and the second plane 363 can be interpolated by extending the subsequently described techniques. Similar techniques can be applied to n-dimensional spaces.

Although the bilateral-bilinear interpolation algorithm is applicable to n-dimensional spaces, subsequent discussion of the algorithm is directed to two-dimensional spaces containing image data. Each region is a two-dimensional patch containing points that represent pixels. One skilled in the art will understand how to modify the described algorithm to be applicable to higher dimensional spaces, for non-image data, and to a source data space that references the data. Such a one will also understand that the invention can be used (without limitation) to map a viewport onto spherical, cylindrical, and panoramic spaces.

Figure 4A:
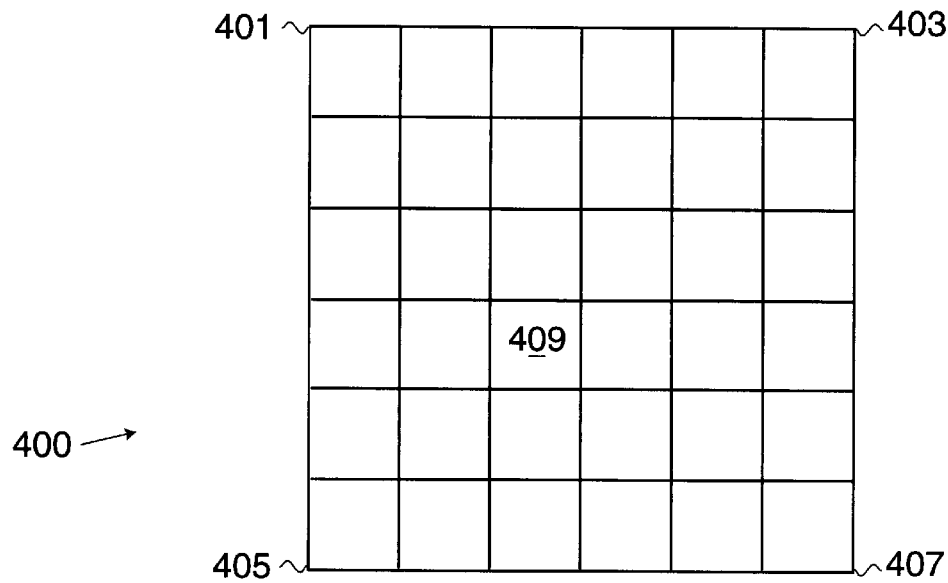
FIG. 4A illustrates a gridded patch in two-dimensions in accordance with a preferred embodiment.

FIG. 4A illustrates a patch in destination data space, indicated by general reference character 400, bounded by a first grid point 401, a second grid point 403, a third grid point 405 and a fourth grid point 407. The destination patch 400 contains a number of pixels (in the illustration, 36 pixels) of which a pixel 409 is but one. The bilateral-bilinear interpolation algorithm efficiently generates data values for the pixels contained in the destination patch 400. In this particular illustration, the 36 pixels are arranged in six scan lines. Each scan line is six pixels long. One skilled in the art will understand that the destination patch 400 need not be square and may include more or fewer pixels than the 36 used in the illustration. The grid points are mapped to the source data space as is shown with respect to FIG. 4B.

Figure 4B:
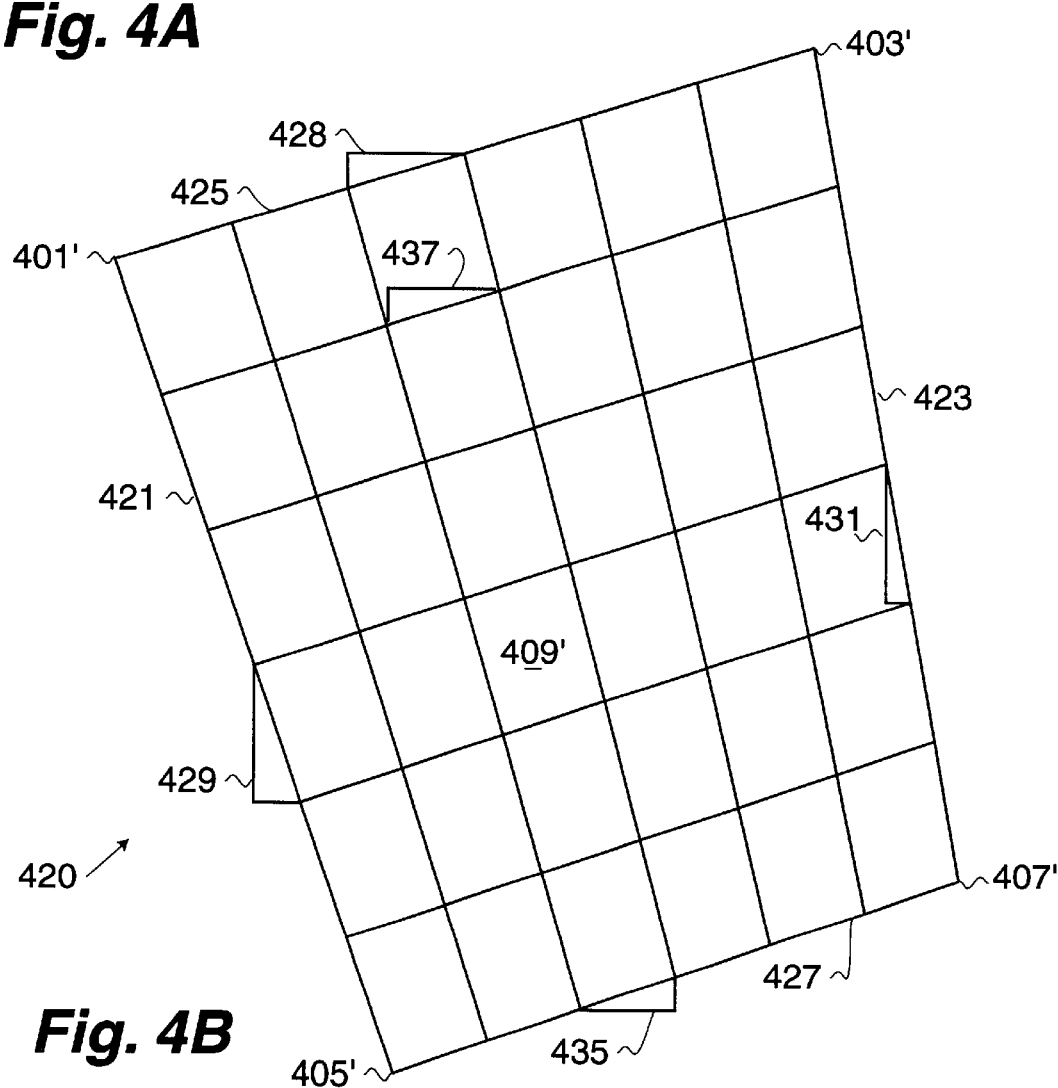
FIG. 4B illustrates the gridded patch of FIG. 4A as mapped into the source data space in accordance with a preferred embodiment

FIG. 4B illustrates a mapped patch in source data space, indicated by general reference character 420, indicating some of the parameters used by the bilateral-bilinear interpolation algorithm. The mapped patch 420 is bounded by the mapped first grid point 401', the mapped second grid point 403', the mapped third grid point 405', and the mapped fourth grid point 407' each of which have been precisely mapped to the source data space from the corresponding points in the destination data space. The data that is used to generate the value for the pixel 409 in the destination data space is located at a mapped pixel contribution area 409'. The mapped pixel contribution area 409' contains pixels of a warped image at a resolution possibly different from the pixel resolution in the destination data space. Techniques known in the art are used to determine the value of the pixel 409 based on the information within the mapped pixel contribution area 409'.

The mapped grid points define lines that bound the mapped patch 420. Thus, the mapped first grid point 401' and the mapped third grid point 405' define a second boundary line 421; the mapped second grid point 403' and the mapped fourth grid point 407' define a third boundary line 423; the mapped first grid point 401' and the mapped second grid point 403' define a first boundary line 425 and a mapped third grid point 405' and a mapped fourth grid point 407' define a final boundary line 427. One skilled in the art will understand that a different geometry can be used other than the one described.

A first slope 428 represents the slope of the first boundary line 425. A second slope 429 represents the slope of the second boundary line 421 and in the two-dimensional case includes delta-x and delta-y components. A third slope 431 represents the slope of the third boundary line 423. A final slope 435 represents the slope of the final boundary line 427.

The bilateral-bilinear interpolation algorithm operates by determining the second slope 429 and the third slope 431 for the boundary lines. The second slope 429 and the third slope 431 need not be the same. Each of these slopes is used to determine a respective delta-x and delta-y value that is dependent on the number of scan lines in the destination patch 400 ($N_{yd}$). Next, each pixel in the first scan line in the destination patch 400 is iterated. To do this, a delta-x and delta-y representing the first slope 428 is determined responsive to the number of pixels in the scan line contained by the destination patch 400 ($N_{xd}$), and the coordinates of the starting pixel and the ending pixel. As each destination pixel is iterated the mapped pixel contribution area 409' in the source data space is evaluated to determine a value for the destination pixel. As the destination pixel is advanced, the corresponding position in the source data space is advanced by the delta-x and delta-y corresponding to the first slope 428. Once the first scan line has been processed subsequent scan lines in the destination patch 400 are processed. The starting coordinates for a subsequent scan line in the mapped patch 420 is advanced by the delta-x and delta-y corresponding to the second slope 429 and the ending position of the subsequent scan line in the mapped patch 420 is advanced by the delta-x and delta-y corresponding to the third slope 431. Thus, the subsequent slope for each mapped scan line changes dependent on the slope of the second boundary line 421 and the third boundary line 423. Thus for example, a subsequent slope 437 can be (and usually is) different from the first slope 428, the final slope 435 and any other subsequent slope.

Each subsequent scan line in the destination patch 400 is iterated (such that the last subsequent scan line is the final boundary line 427).

Figure 1A:
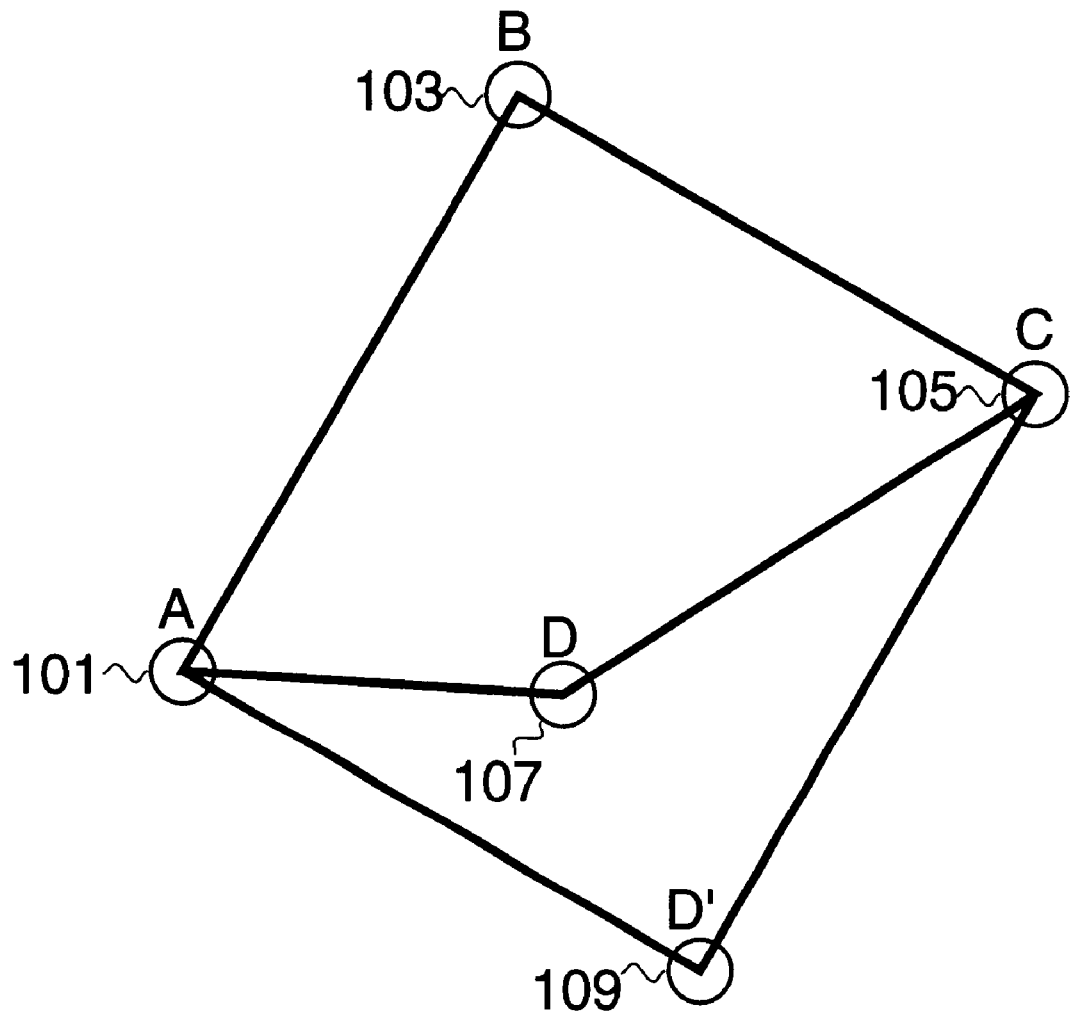
FIG. 1A illustrates a mapping artifact resulting from an affine transformation.
Figure 1B:
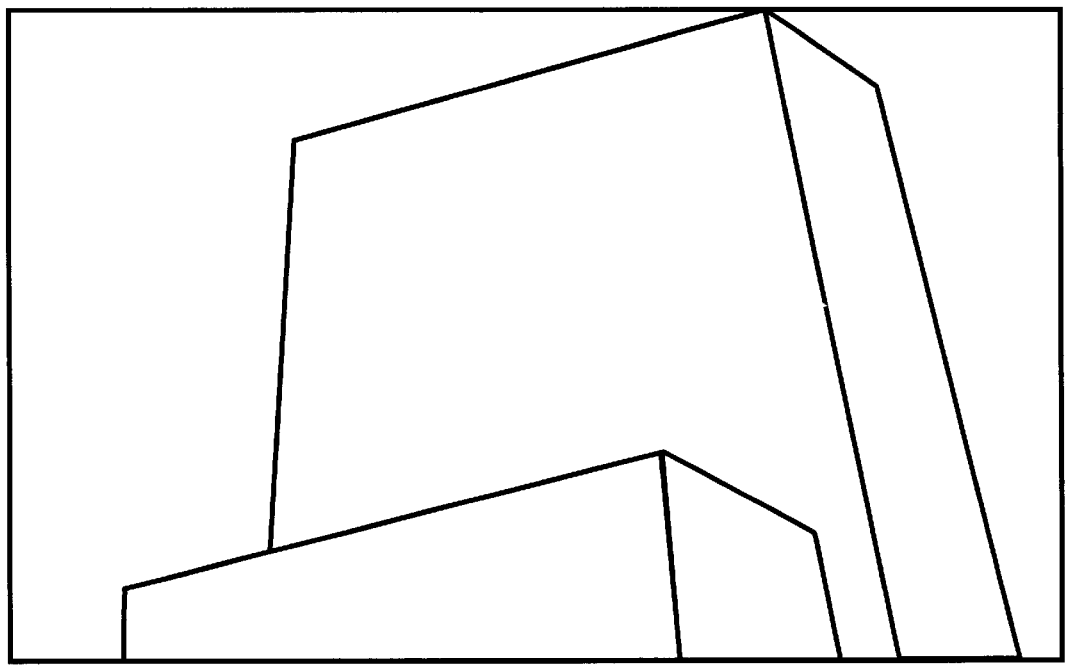
FIG. 1B illustrates a presentation of an image without mapping artifacts.
Figure 1C:
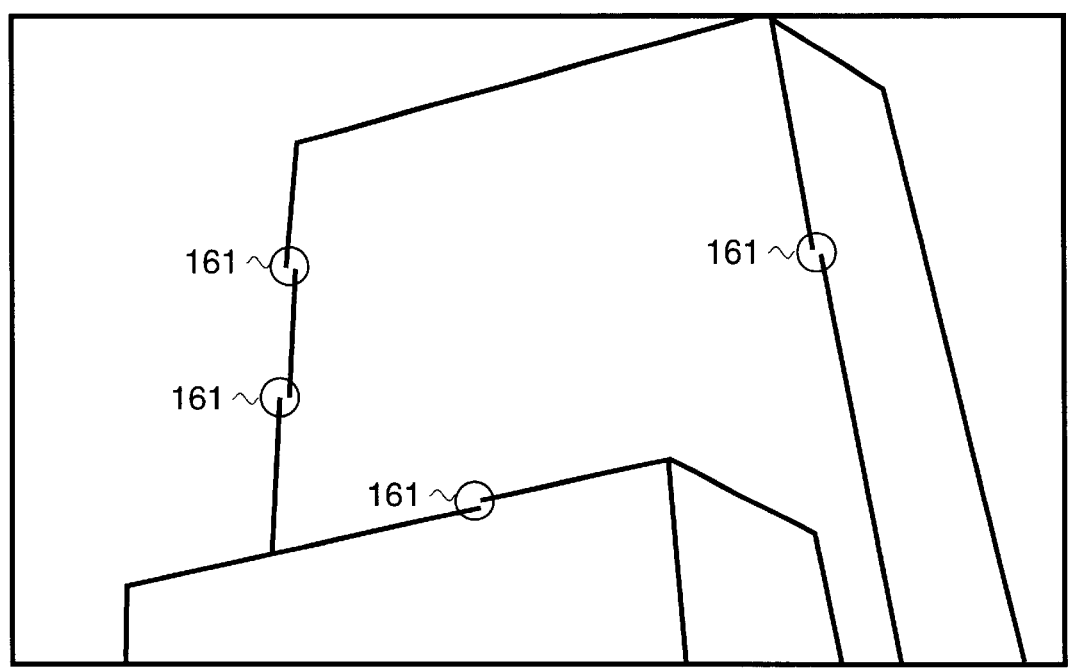
FIG. 1C illustrates a presentation of an image with mapping artifacts.

One skilled in the art will understand that the bilateral-bilinear interpolation algorithm, previously summarized and subsequently described in detail, assures that adjacent patches correctly align. Thus, the bilateral-bilinear interpolation algorithm does not generate mapping artifacts as shown in FIG. 1A and FIG. 1C.

Data Space Mapping

Figure 5:
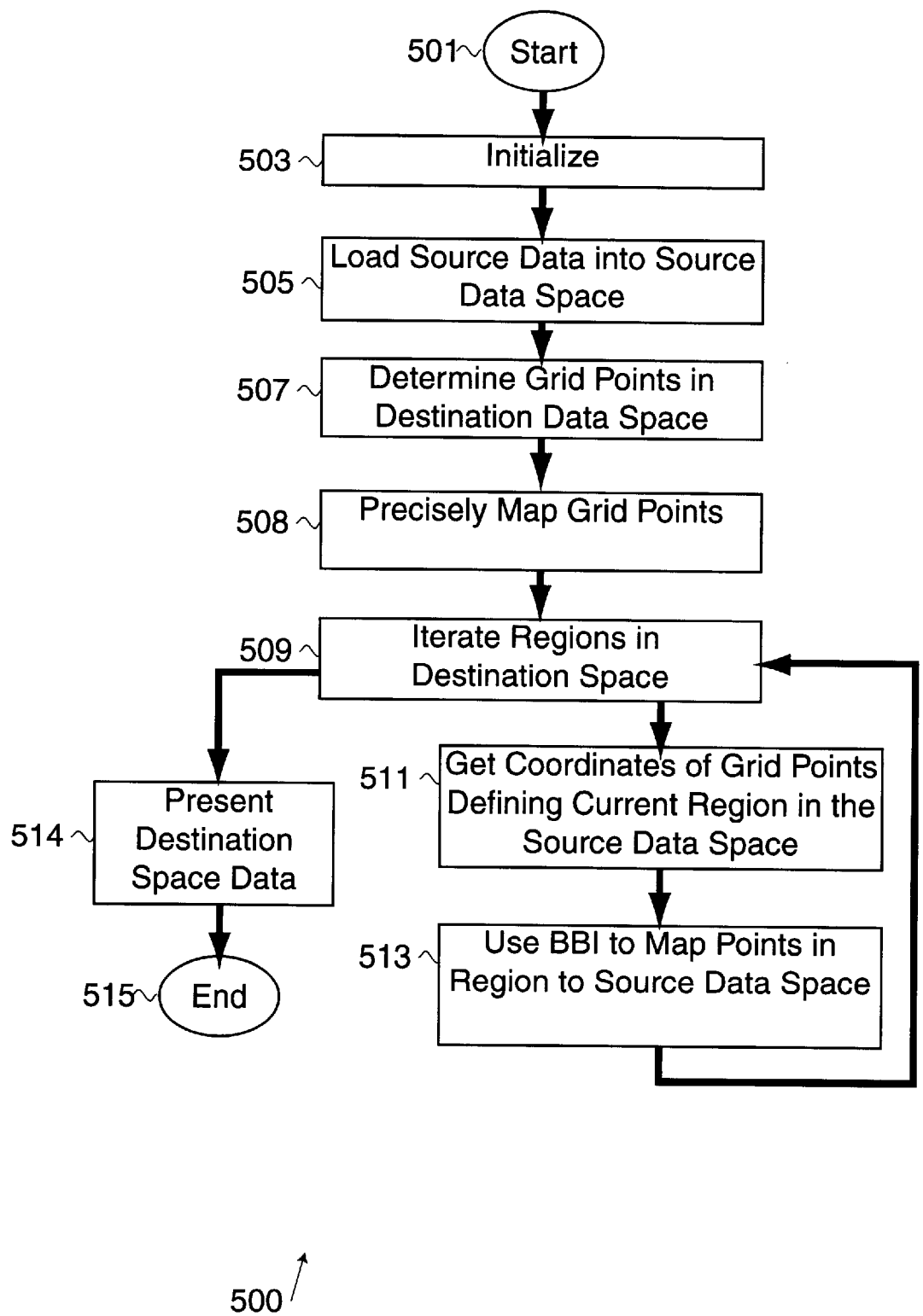
FIG. 5 illustrates an overview of the process used to backward map pixels in a destination data space to a source data space in accordance with a preferred embodiment.

FIG. 5 illustrates a mapping process, indicated by general reference character 500 used to backward map data points in a destination data space to data points in a source data space. The mapping process 500 initiates at a 'start' terminal 501 and continues to an 'initialization' procedure 503. The 'initialization' procedure 503 performs initialization steps for the mapping process 500. These steps can include steps for allocating memory for the source data space, allocating memory for the destination data space, determining the resolution of the presentation device (if any) used to present the destination data, and the spacing of grid points in the destination data space. Next, the mapping process 500 continues to a 'load source data' procedure 505 that inputs the source data into the source data space. The source data can be read (without limitation) from a file, a scanner device, a video device, from a network, a medical diagnostic tool or other similar device. In addition, the source data can represent a portion of a video data stream (the video data stream can be compressed; in addition the video stream can be live video, stored video or computer generated video). The 'load source data' procedure 505 need not complete before the mapping process 500 continues to a 'determine grid points' procedure 507. The 'determine grid points' procedure 507 uses the resolution and the size of the destination data space and possibly other parameters to determine the size of the region. Depending on the configuration of the source data space and the destination data space, the region can be n-dimensional. The region defines the data points that will be interpolated instead of being precisely mapped. The bilateral-bilinear interpolation algorithm can be applied to n-dimensional spaces. When the region is two-dimensional, the region is referred to as a patch.

A 'precisely map grid points' procedure 508 precisely maps the grid points that bound the selected region in the destination data space to points in the source data space. The 'precisely map grid points' procedure 508 uses well known transformations that can include floating point multiplication and division operation's to precisely locate points in the source data space that correspond to the grid points in the destination data space.

Once the grid points that bound the region have been precisely mapped, the mapping process 500 continues to an 'iterate region' procedure 509 that iterates each region in the destination data space that is to be interpolated. A 'get grid point coordinates in source data space' procedure 511 obtains the grid points that bound the iterated region. Then a 'map points in region' procedure 513 applies a bilateral-bilinear interpolation algorithm to approximately map the points in the region to a portion of the data in the source data space. The bilateral-bilinear interpolation algorithm is subsequently described with respect to FIG. 6.

The mapping process 500 repeats to the 'iterate region' procedure 509 until all the regions in the destination data space are iterated. The resulting data in the destination data space can then be presented by a 'present destination space data' procedure 514. This presentation can be accomplished (without limitation) by visually presenting the information by using a presentation device such as a printer or monitor, by providing a printout of the data, or by subsequent processing of the data using other mechanisms. The mapping process 500 completes through an 'end' terminal 515.

One skilled in the art will understand that the precisely mapped grid points define lines in the source data space that can serve as boundary lines for the mapped region in the source data space.

Figure 6:
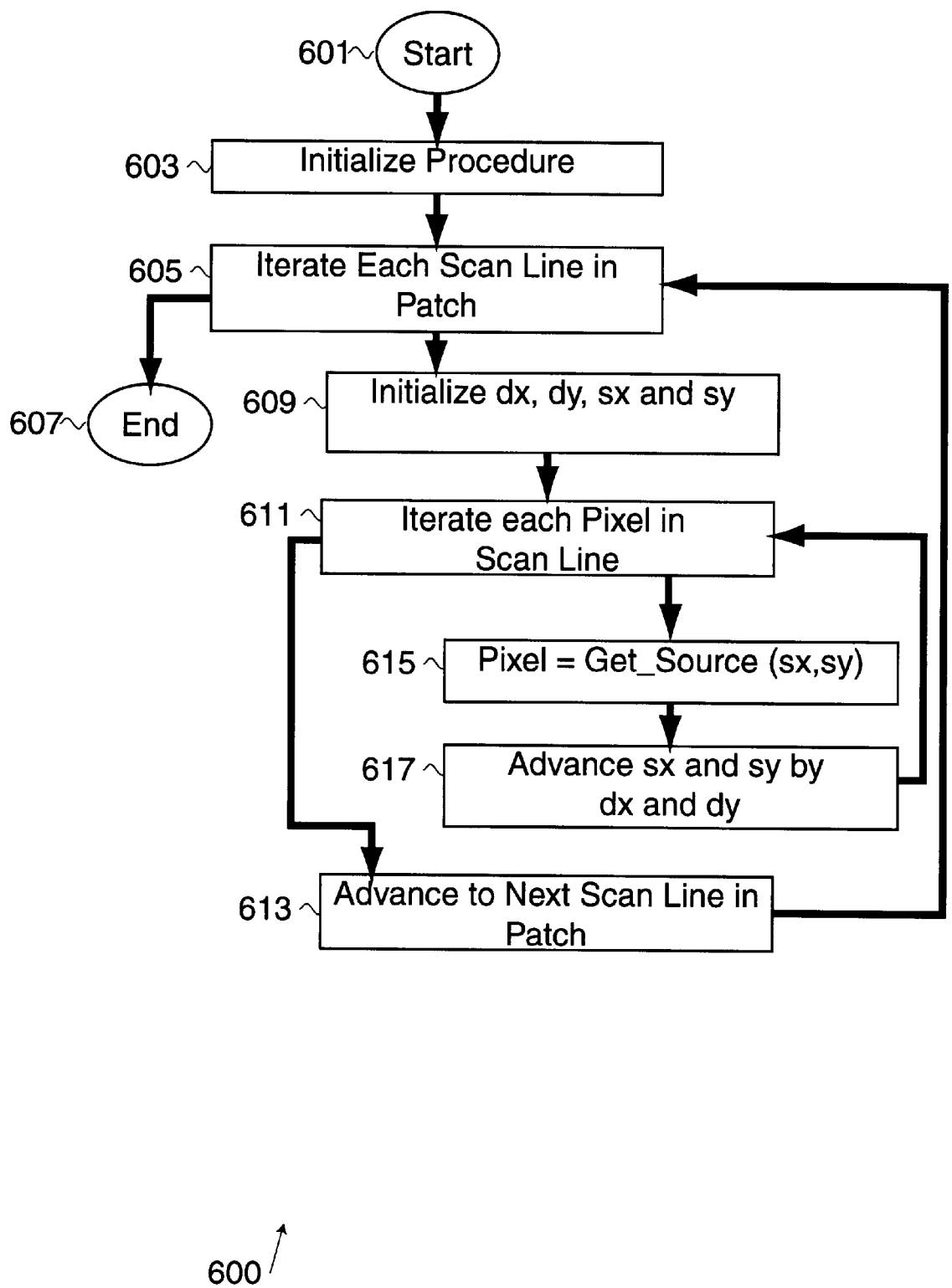
FIG. 6 illustrates a bilateral-bilinear interpolation algorithm that backward maps pixels in a destination region to a source data space in accordance with a preferred embodiment.

FIG. 6 illustrates a bilateral-bilinear interpolation algorithm process, indicated by general reference character 600 that is invoked from the 'map points in region' procedure 513 of FIG. 5. A preferred embodiment is directed towards mapping data between two two-dimensional data spaces. This embodiment can be used to generate a perspective corrected image from a warped image that was generated from a true image projected through a lens (such as a fisheye lens or a catadioptric lens). One skilled in the art will understand that a physical lens need not be used to generate the warped image as ray-tracing techniques through a virtual lens can also be used to generate the warped image.

The bilateral-bilinear interpolation algorithm process 600 initiates at a 'start' terminal 601 and continues to an 'initialize' procedure 603. The 'initialize' procedure 603 determines the slopes for the boundary lines in the source data space that define the limits of the scan lines in the patch. The slope is defined by a delta-x and delta-y that depend on the number of scan lines in the patch. The 'initialize' procedure 603 also defines the starting and ending coordinates in the source data space for the first scan line that is to be interpolated. For a patch bounded by points. $P_0(x_0,y_0)$, $P_1(x_1,y_1)$, $P_2(x_2,y_2)$, and $P_3(x_3,y_3)$ (these points corresponding to the mapped first grid point 401', the mapped second grid point 403', the mapped third grid point 405', and the mapped fourth grid point 407' of FIG. 4B) in the source data space and where the patch in the destination data space includes $N_{yd}$ scan lines, each scan line containing $N_{xd}$ pixels, the 'initialize' procedure 603 can include steps similar to:

```
dxl = (x2-x0)/nyd;      // determine slope of left line
dyl = (y2-y0)/nyd;
dxr = (x3-x1)/nyd;      // determine slope of right line
dyr = (y3-y1)/nyd;
startx = x0;            // set starting coordinates
starty = y0;
endx = x1;              // set ending coordinates
endy = y1;
```

Next, the bilateral-bilinear interpolation algorithm process 600 continues to an 'iterate scan line in patch' procedure 605 that iterates each scan line in the patch in the destination data space. When all the scan lines in the patch have been iterated,, the bilateral-bilinear interpolation algorithm process 600 completes through an 'end' terminal 607. The number of iterations to iterate each scan line in the patch is the value of nyd.

An 'initialize working variables' procedure, 609 initializes the variables used for the iteration of the pixels in the iterated scan line. These initializations include determining the slope for the iterated scan line based on the coordinates of the start point and the end point of the scan line in the source data space. The start point of the scan line substantially lies on the boundary line defined by $P_0$ and $P_2$. The end point of the scan line substantially lies on the line defined by $P_1$ and $P_3$. Thus, these lines bound each scan line. The slope of the scan line is determined using the start point, the end point, and the number of pixels in the scan line in the patch. The 'initialize working variables' procedure 609 can include steps similar to:

```
dx = (endx-startx)/nxd;    // determine scan line slope
dy = (endy-starty)/nxd;
sx = startx;
sy = starty;
```

An 'iterate each pixel in scan line' procedure 611 iterates each pixel in the destination scan line. To iterate each pixel in the scan line requires $N_{xd}$ iterations. When all the pixels in the line have been iterated, the bilateral-bilinear interpolation algorithm process 600 continues to an 'advance to next scan line in patch' procedure 613. The 'advance to next scan line in patch' procedure 613 advances the startx, starty, endx and endy values by dxl, dyl, dxr, and dyr respectively. Thus, the 'iterate each pixel in scan line' procedure 611 determines a subsequent starting point and a subsequent ending point that bound a subsequent line that has a subsequent line slope. Thus, the subsequent line depends on the slope of the boundary lines. The 'advance to next scan line in patch' procedure 613 can include steps similar to:

```
startx += dxl;      // determine new scan line start
starty += dyl;      //    coordinates
endx += dxr;        // determine new scan line end
endy += dyr;        //    coordinates
```

One skilled in the art will understand that the interpolation of each scan line thus depends on the slope of the patch's bounding lines. Thus, the end position of each scan line in one region substantially matches the start position of each scan line for an adjacent patch. The result is that there are no interpolation artifacts between adjacent patches (or regions). Once the 'advance to next scan line in patch' procedure 613 completes, the bilateral-bilinear interpolation algorithm process 600 continues to the 'iterate scan line in patch' procedure 605 to iterate the next scan line in the patch or to exit if all scan lines have been iterated.

A 'set pixel' procedure 615 obtains the data value for the pixel in the destination data space from the data area specified by sx and sy in the source data space. One skilled in the art will understand how to obtain the value of a destination pixel from the source data space given coordinates in the source data space. Such a one will also understand how to combine data values in the source data space to generate the data value in the destination data space.

Once the 'set pixel' procedure 615 completes, the bilateral-bilinear interpolation algorithm process 600 continues to an 'advance to next pixel in scan line' procedure 617. The 'advance to next pixel in scan line' procedure 617 advances sx and sy by dx and dy respectively. Next, the bilateral-bilinear interpolation algorithm process 600 continues to the 'iterate each pixel in scan line' procedure 611 until each pixel in the scan line has been iterated.

One skilled in the art will understand that the invention improves the mapping between two data spaces while still maintaining high performance.

From the foregoing, it will be appreciated that the invention has (without limitation) the following advantages:

1) The invention dramatically reduces mapping artifacts when mapping from one data space to another.
2) The invention provides a high performance mapping capability between data spaces.
3) The invention provides a superior real-time presentation of a visual image when the source data space contains warped image data.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein.

What is claimed is:

1. A computer controlled method including steps of:
   determining a region in a destination data space, said region bounded by a plurality of grid points and said region defining a first plurality of data points in said destination data space;
   precisely mapping said plurality of grid points to a plurality of mapped grid points in a source data space associating a second plurality of data points, wherein said plurality of mapped grid points define a plurality of boundary lines that represent the boundary of said region as mapped into said source data space; and
   applying a bilateral-bilinear interpolation algorithm to map said first plurality of data points to said second plurality of data points wherein the bilateral-bilinear interpolation algorithm includes steps of:
      determining a second slope for a second of said plurality of boundary lines and a third slope for a third of said plurality of boundary lines, wherein a first of said plurality of boundary lines is bounded by said second of said plurality of boundary lines and said third of said plurality of boundary lines;

determining a subsequent line defined by a subsequent starting point and a subsequent ending point dependent on said second slope and said third slope respectively, said subsequent line having a subsequent line slope also dependent on said second slope and said third slope;

iterating, responsive to said subsequent line slope, to map some of said first plurality of data points to some of said second plurality of data points associated with said subsequent line; and repeating the step of determining said subsequent line and the step of iterating until substantially all of said first plurality of data points in said region are mapped to said source data space.

2. The computer controlled method of claim 1 further including:

determining a first slope for said first of said plurality of boundary lines; and iterating, responsive to said first slope, to map some of said first plurality of data points to some of said second plurality of data points associated with said first of said plurality of boundary lines.

3. The computer controlled method of claim 1 further including:

storing a value for one of said first plurality of data points.

4. The computer controlled method of claim 1 wherein said region is a patch and said destination data space is a two dimensional space.

5. The computer controlled method of claim 1 wherein said second plurality of data points represents a warped image and said first plurality of data points represents a perspective corrected image.

6. The computer controlled method of claim 5 wherein said warped image represents a true image warped by a lens, said perspective corrected image substantially representing said true image.

7. The computer controlled method of claim 6 wherein said lens is a catadioptric lens.

8. The computer controlled method of claim 1 further including presenting said first plurality of data points using a presentation device.

9. An apparatus having a central processing unit (CPU) and a memory coupled to said CPU, said apparatus including:

a region determination mechanism configured to determine a region in a destination data space, said region bounded by a plurality of grid points and said region defining a first plurality of data points in said destination data space;

a precise mapping mechanism configured to precisely map said plurality of grid points determined by the region determination mechanism to a plurality of mapped grid points in a source data space associating a second plurality of data points, wherein said plurality of mapped grid points define a plurality of boundary lines that represent the boundary of said region as mapped into said source data space; and a bilateral-bilinear interpolation mechanism configured to map said first plurality of data points in said region to said second plurality of data points using said plurality of mapped grid points wherein the bilateral-bilinear interpolation mechanism includes:

a boundary line determination mechanism configured to determine a second slope for a second of said plurality of boundary lines and a third slope for a third of said plurality of boundary lines, wherein a first of said plurality of boundary lines is bounded by said second of said plurality of boundary lines and said third of said plurality of boundary lines;

a subsequent line determination mechanism configured to determine a subsequent line defined by a subsequent starting point and a subsequent ending point dependent on said second slope and said third slope respectively, said subsequent line having a subsequent line slope also dependent on said second slope and said third slope;

a data point iteration mechanism configured to map some of said first plurality of data points to some of said second plurality of data points associated with said subsequent line and responsive to said subsequent line slope; and a loop mechanism configured to repetitively apply the subsequent line determination mechanism and the data point iteration mechanism until substantially all of said first plurality of data points in said region are mapped to said source data space.

10. The apparatus of claim 9 further including:

an assignment mechanism configured to store a value for one of said first plurality of data points.

11. The apparatus of claim 9 wherein said region is a patch and said destination data space is a two dimensional space.

12. The apparatus of claim 9 wherein said second plurality of data points represents a warped image and said first plurality of data points represents a perspective corrected image.

13. The apparatus of claim 12 wherein said warped image represents a true image warped by a lens, said perspective corrected image substantially representing said true image.

14. The apparatus of claim 13 wherein said lens is a catadioptric lens.

15. The apparatus of claim 9 further including a presentation device configured to present said first plurality of data points.

16. A computer program product including:

a computer usable storage medium having computer readable code embodied therein for causing a computer to map a destination data space to a source data space, said computer readable code including:

computer readable program code configured to cause said computer to effect a region determination mechanism configured to determine a region in said destination data space, said region bounded by a plurality of grid points and said region defining a first plurality of data points in said destination data space;

computer readable program code configured to cause said computer to effect a precise mapping mechanism configured to precisely map said plurality of grid points determined by the region determination mechanism to a plurality of mapped grid points in said source data space associating a second plurality of data points, wherein said plurality of mapped grid points define a plurality of boundary lines that represent the boundary of said region as mapped into said source data space; and computer readable program code configured to cause said computer to effect a bilateral-bilinear interpolation mechanism configured to map said first plurality of data points in said region to said second plurality of data points using said plurality of mapped grid points wherein the bilateral-bilinear interpolation mechanism includes:

computer readable program code configured to cause said computer to effect a boundary line determination mechanism configured to determine a second slope for a second of said plurality of boundary lines and a third slope for a third of said plurality of boundary lines, wherein a first of said plurality of boundary lines is bounded by said second of said plurality of boundary lines and said third of said plurality of boundary lines;

computer readable program code configured to cause said computer to effect a subsequent line determination: mechanism configured to determine a subsequent line defined by a subsequent starting point and a subsequent ending point dependent on said second slope and said third slope respectively, said subsequent line having a subsequent line slope also dependent on said second slope and said third slope;

computer readable program code configured to cause said computer to effect a data point iteration mechanism configured to map some of said first plurality of data points to some of said second plurality of data points associated with said subsequent line and responsive to said subsequent line slope; and computer readable program code configured to cause said computer to effect a loop mechanism configured to repetitively apply the subsequent line determination mechanism and the data point iteration mechanism until substantially all of said first plurality of data points in said region are mapped to said source data space.

17. The computer program product of claim 16 wherein said region is a patch and said destination data space is a two dimensional space.

18. The computer program product of claim 16 wherein said second plurality of data points represents a warped image and said first plurality of data points represents a perspective corrected image.

19. The computer program product of claim 18 wherein said warped image represents a true image warped by a lens, said perspective corrected image substantially representing said true image.

20. The computer program product of claim 19 wherein said lens is a caladioptric lens.

21. The computer program product of claim 16 further including computer readable program code configured to cause said computer to drive a presentation device configured to present said first plurality of data points.

22. A computer program product including,
a computer data signal embodied in a carrier wave having computer readable code embodied therein for causing a computer to map a destination data space to a source data space, said computer readable code including:

computer readable program code configured to cause said computer to effect a region determination mechanism configured to determine a region in said destination data space, said region bounded by a plurality of grid points and said region defining a first plurality of data points in said destination data space;

computer readable program code configured to cause said computer to effect a precise mapping mechanism configured to precisely map said plurality of grid points determined by the region determination mechanism to a pluralityof mapped grid points in said source data space associating a second plurality of data points, wherein said plurality of mapped grid points define a plurality of boundary lines that represent the boundary of said region as mapped into said source data space; and computer readable program code configured to cause said computer to effect a bilateral-bilinear interpolation mechanism configured to map said first plurality of data points in said region to said second plurality of data points using said plurality of mapped grid points wherein the bilateral-bilinear interpolation mechanism includes:

computer readable program code configured to cause said computer to effect a boundary line determination mechanism configured to determine a second slope for a second of said plurality of boundary lines and a third slope for a third of said plurality of boundary lines, wherein a first of said plurality of boundary lines is bounded by said second of said plurality of boundary lines and said third of said plurality of boundary lines;

computer readable program code configured to cause said computer to effect a subsequent line determination mechanism configured to determine a subsequent line defined by a subsequent starting point and a subsequent ending point dependent on said second slope and said third slope respectively, said subsequent line having a subsequent line slope also dependent on said second slope and said third slope;

computer readable program code configured to cause said computer to effect a data point iteration mechanism configured to map some of said first plurality of data points to some of said second plurality of data points associated with said subsequent line and responsive to said subsequent line slope; and computer readable program code configured to cause said computer to effect a loop mechanism configured to repetitively apply the subsequent line determination mechanism and the data point iteration mechanism until substantially all of said first plurality of data points in said region are mapped to said source data space.

23. The computer program product of claim 22 wherein said region is a patch and said destination data space is a two dimensional space.

24. The computer program product of claim 22 wherein said second plurality of data points represents a warped image and said first plurality of data points represents a perspective corrected image.

25. The computer program product of claim 24 wherein said warped image represents a true image warped by a lens, said perspective corrected image substantially representing said true image.

* * * * *